United States Patent
Cross et al.

(10) Patent No.: US 6,936,968 B2
(45) Date of Patent: Aug. 30, 2005

(54) RETROFIT LIGHT EMITTING DIODE TUBE

(75) Inventors: Robert Porter Cross, Mansfield, MA (US); Robert Hartwell Cross, Rehoboth, MA (US); Jeffery Parker Cross, Foxboro, MA (US)

(73) Assignee: Mule Lighting, Inc., Providence, RI (US)

( * ) Notice: Subject to any disclaimer, the term of this patent is extended or adjusted under 35 U.S.C. 154(b) by 251 days.

(21) Appl. No.: 09/998,274

(22) Filed: Nov. 30, 2001

(65) Prior Publication Data

US 2003/0102810 A1 Jun. 5, 2003

(51) Int. Cl.[7] .............................................. H01J 13/46
(52) U.S. Cl. ............................ 315/74; 315/246; 313/21
(58) Field of Search .......................... 315/74, 73, 246, 315/291, 307; 313/21, 39, 249, 558

(56) References Cited

U.S. PATENT DOCUMENTS

| | | | | |
|---|---|---|---|---|
| 5,800,788 A | * | 9/1998 | Douren ...................... 422/161 |
| 5,811,934 A | * | 9/1998 | Bunk et al. ................. 313/579 |
| 2002/0060526 A1 | * | 5/2002 | Timmermans et al. ...... 315/246 |
| 2004/0032220 A1 | * | 2/2004 | Cok et al. ................... 315/291 |

* cited by examiner

*Primary Examiner*—Don Wong
*Assistant Examiner*—Jimmy T. Vu
(74) *Attorney, Agent, or Firm*—Peter R. Hagerty

(57) ABSTRACT

An LED light tube for replacement for fluorescent light tubes includes an elongated cylindrical transparent envelope, a base cap at each end of the envelope, and at least one LED device in electrical communication with the base cap. The LED light tube is adapted for use in troffer light fixtures.

14 Claims, 6 Drawing Sheets

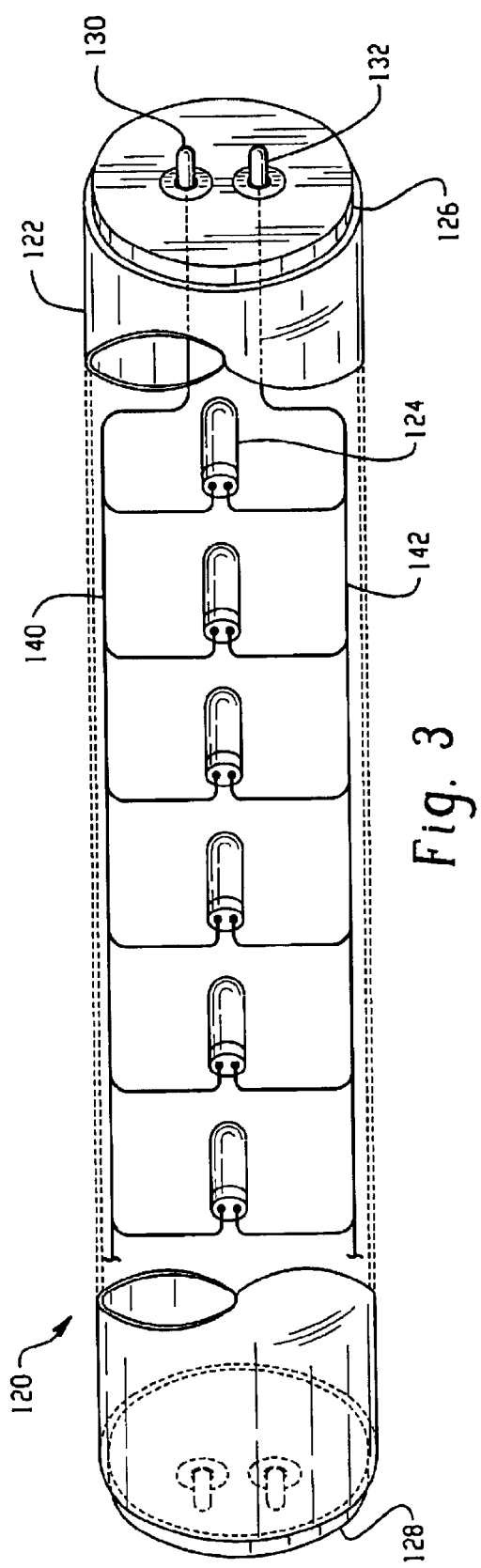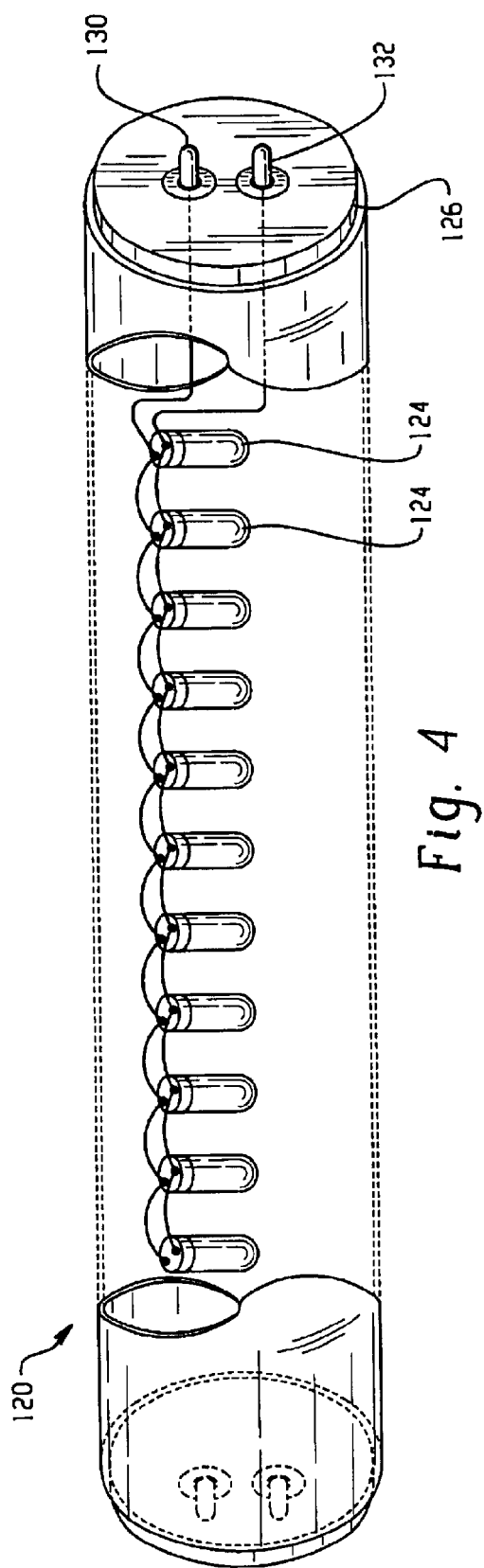

RETROFIT LIGHT EMITTING DIODE TUBE

BACKGROUND OF THE INVENTION

The present disclosure relates to light bulbs and in particular, to light bulbs comprised of light emitting diodes.

There are millions of light fixtures installed and being produced each year to provide both task and general lighting within schools, offices, homes, marine vessels, aircraft and the like. In recent decades, more and more of these applications have been addressed with the use of a fluorescent lamp as the light source. The advent of fluorescent lighting has been shown to be a significant improvement over incandescent light fixtures. Noted advantages are numerous and include a marked reduction in energy consumption for a given light output, reduced operating temperatures and a "cooler" light rendition index.

Fluorescent lamps are generally characterized as low-pressure arc discharge lamps. A conventional fluorescent lamp commonly used in troffer fixtures is shown in FIG. 1. The fluorescent lamp 10 includes an elongated envelope 12, whose internal wall is coated with a phosphor 14, and an electrode structure 16 at each end of the envelope. The envelope 10 also contains a quantity of an ionizable material 18, such as mercury, and a fill gas at low pressure. The fill gas can be, for example argon or krypton, or a mixture of these and other gases. Each electrode structure 16 includes a stem 20 having a tubulation 22 therein through which the envelope 10 is exhausted. Leads 24 and 26 are mounted on the stem 20 and pass through the stem for connection to terminals 28 and 30 disposed in an end cap 32. A cathode or filament-cathode 34 is connected across each pair of the leads 24 and 26. A voltage, usually supplied by a ballast transformer, is applied across the electrodes to ionize the ionizable material in the presence of the fill gas. The resultant ionization and recombination of ions and electrons produces radiation that interacts with the phosphor coating to produce visible light.

Fluorescent lamps of a given length and type generally do not vary greatly in the electrical power consumed. In the past, most attempts to change the power consumption have been in the direction of increasing the electrical energy requirements to produce a greater light output. However, due to the increasing cost of purchasing electrical energy, it is becoming increasingly desirable to reduce lighting loads in existing facilities. Various ways of doing this include the use of lower wattage light fixtures, the elimination of lamps from certain areas, and the reduction of the number of lamps used in a given area.

Although fluorescent lamps have numerous advantages relative to incandescent sources, these lamps still suffer from a number of disadvantages. For example, the ionizable material and fill gases used to generate the illumination pattern are relatively hazardous materials. Care must be taken to dispose of the fluorescent light fixtures to avoid releasing these materials into the environment. Moreover, fluorescent lamps require the use of a ballast transformer to cause the fluorescent lamps to illuminate. Ballasts frequently fail and require replacement. Moreover, as noted above, the energy costs for operating fluorescent lamps need further improvement.

Accordingly, there remains a need for improved light sources that maintain the advantages incurred with the use of fluorescent lamps yet overcomes the disadvantages with this technology.

SUMMARY OF THE INVENTION

Disclosed herein is a retrofit LED light tube for replacing a fluorescent light tube in a troffer fixture. The retrofit LED light tube generally comprises an elongated cylindrical transparent envelope; a base cap at each end of the envelope, wherein the base cap comprises a first prong and a second prong extending from the base cap such that the first and second prongs are adapted to electrically communicate with a fluorescent light socket; and at least one LED device in electrical communication with the base cap, wherein a positive terminal of the LED device is in electrical communication with the first prong and a negative terminal is in electrical communication with the second prong.

In another embodiment, the LED light tube comprises an LED light tube for replacement of a fluorescent light tube, the LED light tube comprising: an elongated, cylindrical transparent envelope; a base cap at each end of the envelope, wherein the base cap comprises a first prong and a second prong extending from the base cap; and at least one serial string of LEDs in electrical communication with the base cap having circuitry means for connection with an AC source through a nondissipative voltage dropping element, wherein each one of the at least one serial string of LEDs are connected in parallel with the other and are enclosed in the envelope.

The LED light tube can be used as a replacement for fluorescent light tubes employed in troffer light fixtures. The troffer LED light tube fixture comprises a housing and a tube holder. The tube holder comprises electrical sockets in electrical communication with the LED light tube. The electrical sockets are adapted to receive a first and second prong in the end cap of the LED tube for supporting and providing electrical power to a serial string of LED devices disposed in the LED light tube.

Other embodiments of the invention are contemplated to provide particular features and structural variants of the basic elements. The specific embodiments referred to as well as possible variations and the various features and advantages of the invention will become better understood when considered in connection with the detailed description and drawings that follow.

BRIEF DESCRIPTION OF THE DRAWINGS

Referring now to the figures, which are exemplary embodiments, and wherein the like elements are numbered alike:

FIG. 3 is perspective view of another LED light tube;

FIG. 4 is perspective view of another LED light tube;

FIG. 7 is perspective view of another LED light tube; and.

DETAILED DESCRIPTION OF THE PREFERRED EMBODIMENTS

The present disclosure is directed to a solid-state lamp employing light emissive diodes (LEDs) that are designed as a replacement illumination source for fluorescent lamps. The solid-state lamp, hereinafter referred to as a retrofit LED light tube, may be configured as a replacement for a variety of fluorescent lighting applications. In a preferred embodiment, the LED light tube is adapted for use in so-called troffer-type fluorescent lighting fixtures.

Figure 1:
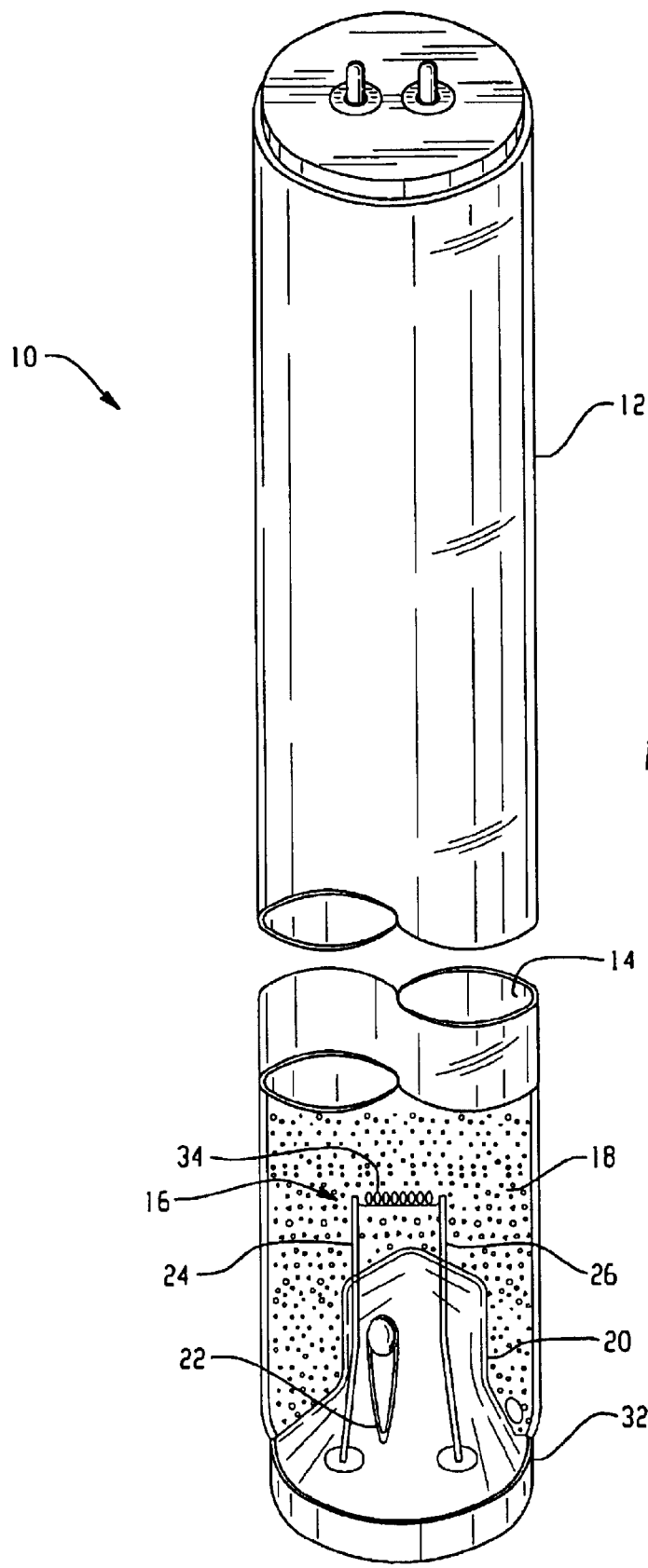
FIG. 1 is a plan view of a conventional fluorescent light bulb.
Figure 2A:
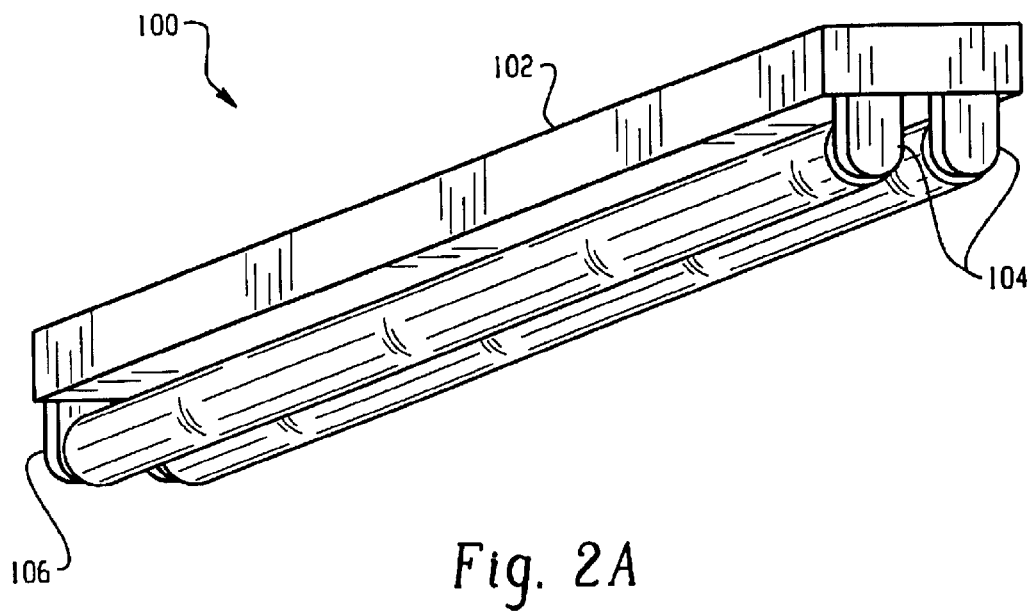
FIGS. 2A and 2B are a perspective view and an end view of a troffer fixture including an LED light tube.
Figure 2B:
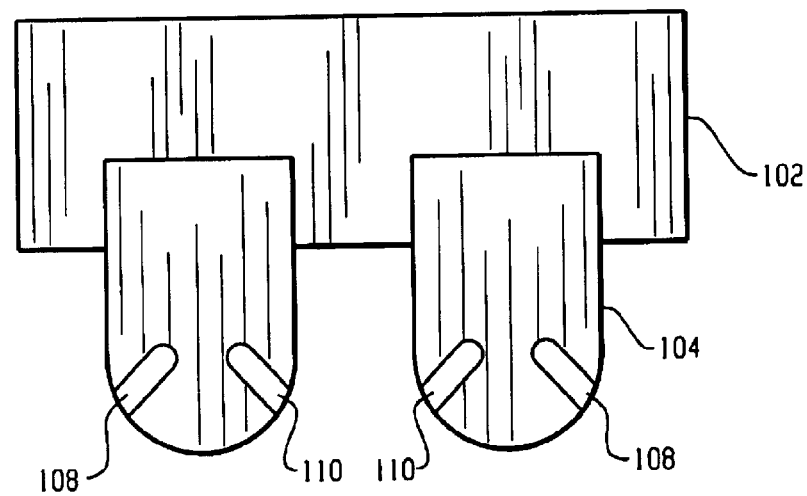

Referring now to FIGS. 2A and 2B, there is shown a troffer fixture assembly 100 suitable for use with the retrofit LED light tube. The troffer assembly is exemplary only, other troffer assemblies suitable for use will be apparent to those skilled in the art in view of this disclosure. The troffer fixture assembly 100 includes a square or rectangular housing 102 typically used with one or more fluorescent light bulbs. The housing 102 comprises a substantially planar body and optional sidewalls depending from the body portion along opposed edges of the planar body portion. The troffer fixture assembly 100 is affixed onto or recessed in a surface such as a ceiling and consists of the housing 102 with a clear, translucent glass or plastic lens (not shown) on the face thereof. The use of the lens is optional. The housing 102 is preferably fabricated from sheet metal and includes an electrical trough adapted to accept electrical wiring from an external AC power source. Between the housing 102 and the lens, if present, is the main tube holder. Electrical sockets 104, 106 are disposed and aligned at each end of the main tube holder. The sockets 104, 106 mechanically and electrically communicate with the LED light tubes. As shown, the electrical sockets 104, 106 include prong holders 108, 110 that are adapted to receive corresponding prongs extending from the light tube. The troffer fixture assembly 100 may further include a reflective material disposed on a surface about the LED light tubes to redirect the light downwards through the lens and maximize light output efficiency. Since the intended use of the LED light tubes are for replacement of fluorescent light tubes, the troffer fixture may further include a ballast transformer. As will be discussed in further detail below, the ballast transformer may be removed, or bypassed during operation of the LED light tube.

FIG. 3 illustrates an LED light tube, generally designated 120. The LED light tube 120 generally comprises a cylindrical elongated transparent envelope 122, at least one serial string of LEDs 124 and a cap 126, 128 at each end of the envelope 122. Each end cap 126, 128 is adapted for insertion into sockets 104, 106. For example, the end cap 126, 128 can include two prongs 130, 132 for installment in the light troffer fixture 100. The prongs for a selected one of the end caps, e.g., 126, are fabricated from conductive materials and provide electrical communication from a power source to the serial string of LEDs. The prongs of the other end cap e.g., 128, serve to provide mechanical support to the tube when the tube is installed the socket 104, 106. Preferably, the other end cap, e.g., 128, is preferably fabricated from non-conductive materials or is not in electrical communication with the LEDs. Alternatively, the end caps 126, 128 may be adapted to electrically and mechanically communicate with other types of troffer electrical sockets. Each end cap 126, 128 further provides a mechanical closure for each end of the envelope 122.

The LEDs and attendant circuitry are preferably disposed within the envelope 122. The circuitry may include a circuit board disposed in the end cap (not shown) for converting AC voltage to the appropriate DC voltage. The LEDs may be interconnected with a single 140 or a pair of rigid, conductive wires 140, 142 electrically connected to the circuit board. The circuit board is then electrically connected to the prongs in one or both of the end caps depending on the design. In the case where the circuit board is connected to one end cap, the LEDs can be connected to the other endcap for providing support. Where only one rigid wire 140 is utilized, the second wire 142 is referred to as the control wire 142. These wires 140, 142 provide both the mechanical support for the LEDs as well as a voltage path from a power source. The individual LEDs are electrically affixed to the wire mechanically using common soldering techniques or the like. Each LED affixed to the wire has two electrical connections, i.e., a positive and negative terminal connected to the wire 140. In the case of the dual fixed wire design, the positive lead from each LED is connected to one wire 140 and the negative LED lead is connected to the other wire 142. Where more than one series of LED circuits are employed, the additional series of LEDs may be connected in parallel or in series with non-conductive materials. For example two serial strings of LEDs can employ non-conductive sleeves into which the ends of each opposing string is pressed. In this case, separate voltage source lead wires would be incorporated that lead back to the common voltage source connected to the end cap as previously described. A variation on this design would allow the LED strings to be twisted lengthwise to create a helix effect for more uniform light distribution.

As shown in FIG. 4, another embodiment in which the LEDs may be interconnected includes soldering each individual LED 124 to provide electrical communication to an adjacent LED 124'. The LEDs are configured with an appropriate number of LEDs allowed for a specific input voltage. For simplicity, each set of voltage source specific LED's is referred to as a string. The interconnected LEDs can then be secured to a fixed or semi-fixed plastic sleeve or holder that is slotted length-wise. In this manner, proper spacing of the LEDs is maintained. The wires are extended back to the voltage source contained in the tube end or end-caps.

Figure 5:
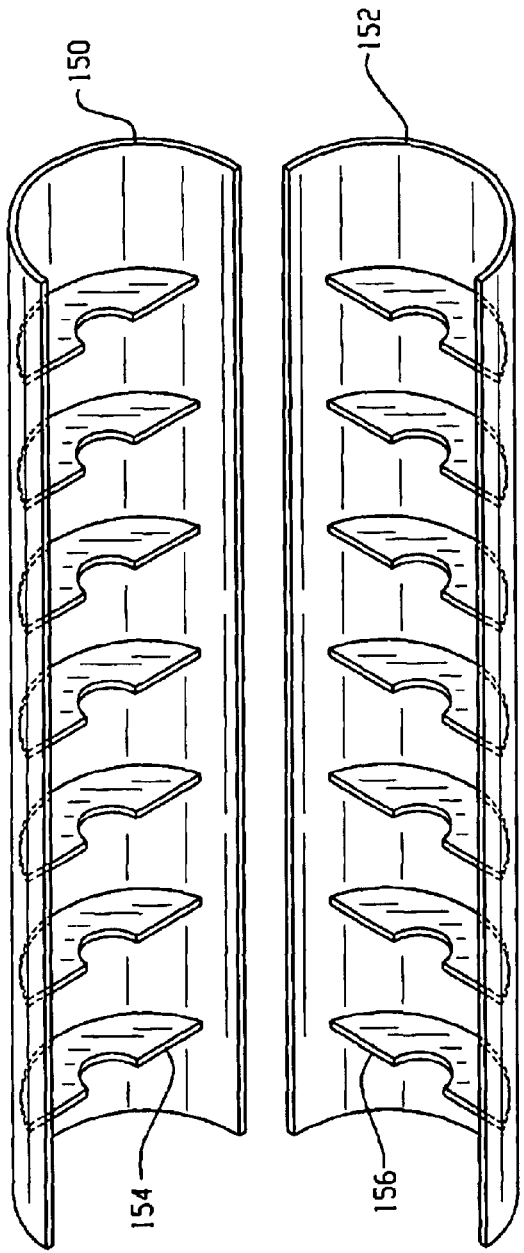
FIG. 5 is perspective view of another LED light tube.

Another embodiment in which the LEDs may be interconnected is shown in FIG. 5. In this embodiment, the envelope of LED light tube comprises a two complementary half round pieces 150, 152 that when mated together form a cylindrical envelope. In each half-round piece 150 or 152, a series of pockets slots, snaps and/or channels 154, 156 respectively, are formed such that the required number of LEDs are disposed in the into the respective pockets, slots, snaps and/or channels along the length of the half tube base. A conductive wire is connected to the LEDs to provide a control voltage. The ends of the wire are connected to voltage tabs or pins that are connected to the conductive leads connected to the external voltage source. The second half-round 152 piece is then pressed onto the base half-round piece 150. The two halves 150, 152 are fastened together using either, snaps or slots built into the injection mold, glue, or other mechanical means such as sliding the end caps over each envelope end of the combined tube halves Alternatively, the serial string of LEDs may be fabricated so that the string can flex. In this manner, the serial string of LEDs can be adapted for use in a variety of applications and may also be configured for maximum light output. For example, the LED light tube may be fabricated to replace circular fluorescent light fixtures.

Figure 6:
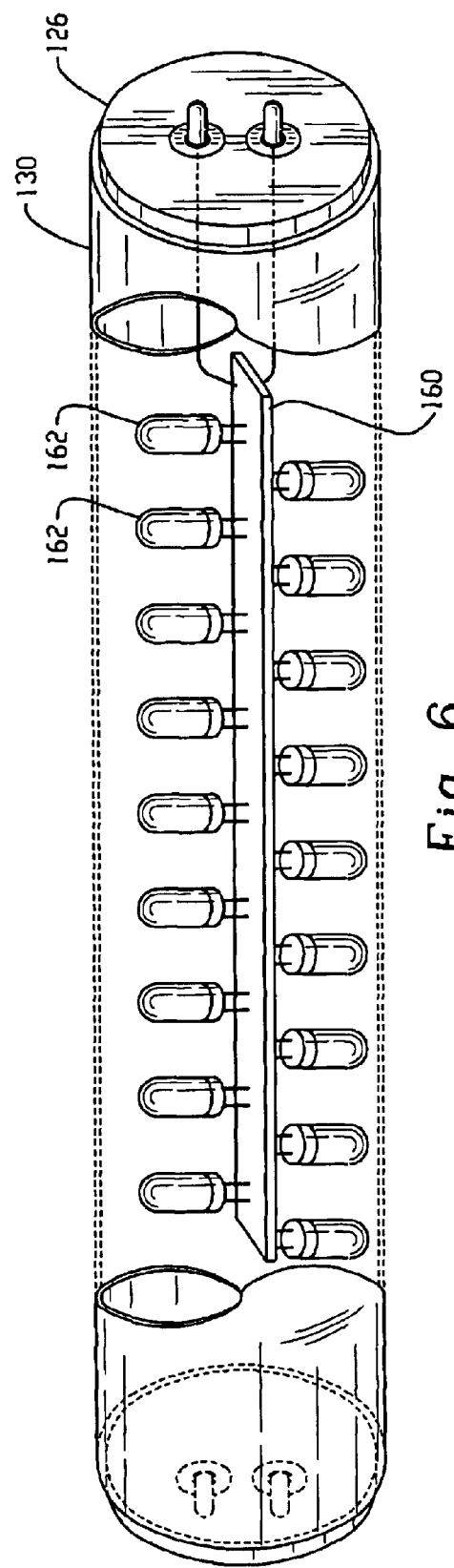
FIG. 6 is perspective view of another LED light tube.

Referring now to FIG. 6, an elongated circuit board 160 can be used for mounting the LEDs 162. The circuit board 160 may then be slid into the envelope 130 and connected to the end caps 126, 128 for providing a source of power.

Figure 7:
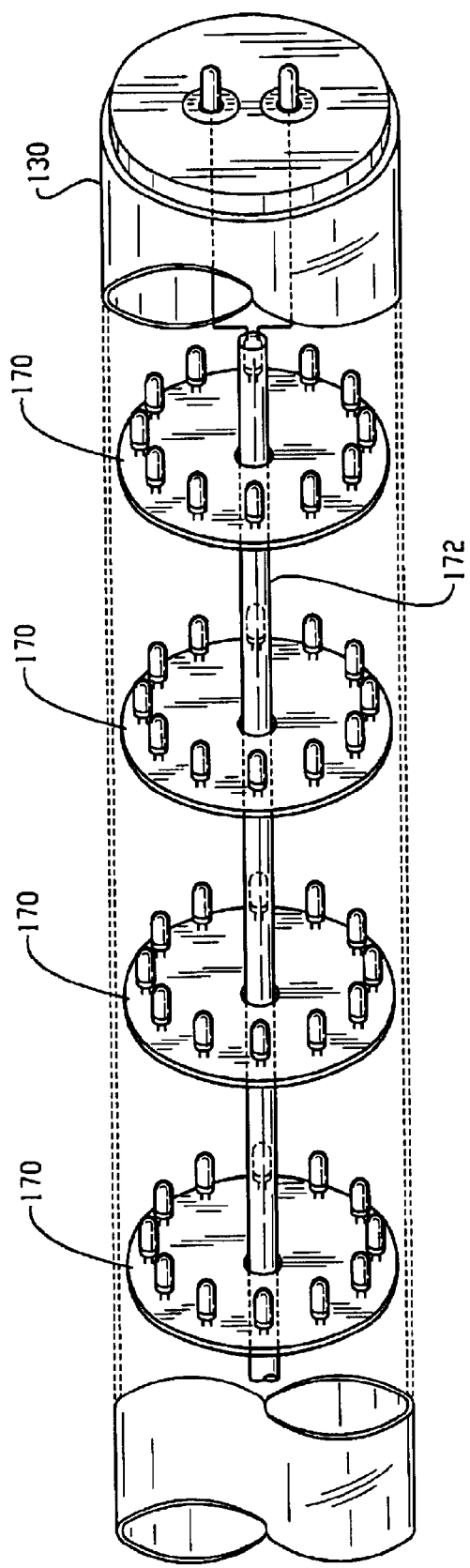

Alternatively, the LEDs could be mounted on a plurality of circuit boards 170 adapted to be attached substantially perpendicular to the elongated wall of the envelope as shown in FIG. 7. A support 172 may be utilized to support the circuit boards 170. A series of the circuit boards 170 would then be spacedly stacked within the envelope 130 so that a series of the circuit boards 170 are deployed through a portion of the length of the tube. The LEDs may be mounted on the circuit board at the outer periphery or mounted on one or both surfaces. The individual LEDs may further be splayed at angle with respect to the circuit board 170 to produce the desired light pattern.

Figure 8:
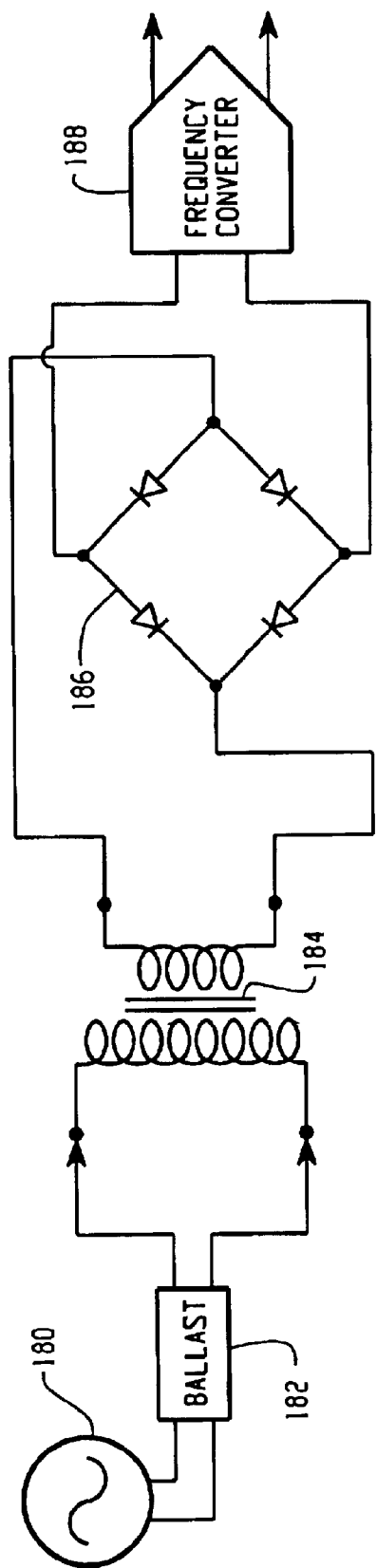
FIG. 8 is a schematic of a ballast conversion circuitry utilizing voltage reduction circuitry and frequency reduction circuitry.

For installation in troffer fixtures 100, wherein the ballast transformer is removed and/or bypassed, it is preferred that the circuitry schematic shown in FIG. 8 is employed. An AC voltage 180 is applied to the ballast 182, if present in the circuit. The ballast is coupled a capacitor 184. The capacitor 184 is used as a reactive impedance to act as a current limiting source to the LEDs. A movistor, more commonly referred to as a varistor, may be utilized to provide additional transient suppression to protect the LEDs from a transient surge, especially when the LED light tube is first turned on. The circuitry schematic further includes a bridge rectifier 186, e.g., a full wave or half waver rectifier, for rectifying the incoming AC voltage to a DC voltage. The bridge rectifier 186 may comprise a single solid-state device or a plurality of discrete diodes connected in series. A frequency converter 188 then converts the DC voltage to an acceptable frequency for operating the LEDs.

The number of LEDs employed will vary with the intended lighting application and the value of the rectified DC voltage, wherein optimization of such is well within the skill of those in the art. For example, suitable light emitting diodes operate at about ±2.0 Vdc such that if the input (rectified) DC voltage is 24 Volts, then a series of 12 light emitting diodes may be combined to achieve the proper voltage application. If more light output is desired, additional strings of light emitting diodes may be connected in parallel. One skilled in the art will recognize that additional circuitry for the strings will be required, e.g., capacitors, resistors, bridge rectifiers, varistors, diodes and the like.

Figure 9:
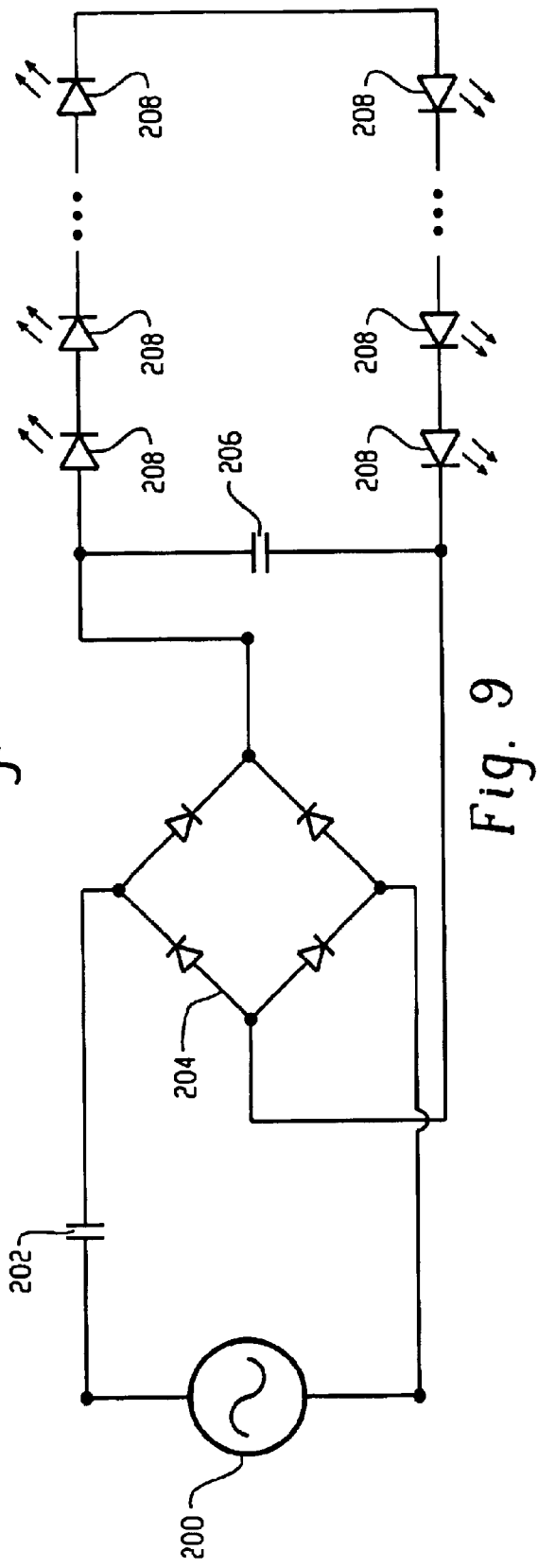
FIG. 9 is a schematic of a circuit diagram for converting AC voltage to a suitable DC voltage.

Alternatively, a suitable electrical circuit diagram in schematic form for converting AC voltage to a suitable DC voltage is shown in FIG. 9. In operation, an AC voltage 200 is applied to the circuit. It should be understood by those skilled in the art that the voltage can vary. For example, the voltage could be 120 volts with a 60 hertz frequency as is standard in the United States, or could be 220 volts with a frequency of 50 hertz as is standard in some other countries. The AC current first passes through a capacitor 202. Preferably, the capacitor is a nonpolarity type capacitor wherein the capacitor functions by lowering the amount of voltage passing through the circuit. Those skilled in the art will appreciate that the amount of capacitance is a function of the amount of LEDs in the circuit and incoming voltage levels. The current then passes through a rectifier 204 for converting the attenuated AC current to a DC current. The rectifier can be a rectifier diode, a bridge rectifier or any other rectifier that is suitable for converting the incoming AC voltage to DC and will be apparent to those of ordinary skill in the art in view of this disclosure. Preferably, a full wave rectifier is used. The DC current then passes through a filtering capacitor 206. The filtered DC current is then used to illuminate the LEDs 208, shown arranged in series. One skilled in the art would appreciate that the LEDs could be arranged in parallel.

For installation in troffer fixtures 100, wherein the ballast transformer is not removed and/or bypassed, additional circuitry is preferably added to address the VAC generated by the ballast. For example, typical ballasts generate about 600 to about 750 VAC on its secondary windings and create frequencies on the order of about 20,000 to about 30,000 cycles. Consequently, the circuitry preferably includes means for reducing the input voltage, e.g., voltage reduction devices such as an electromechanical transformer, solid state rectifiers or the like, for reducing the ballast output voltage to the range of about 120 VAC. Moreover, in the case of electronic ballasts, the circuitry preferably includes a means for reducing the ballast output frequency to about 50 to about 60 cycles. Thus, depending on the type of ballast, the circuitry may include voltage reduction circuitry and/or frequency reduction circuitry.

Each LED is a semiconductor PN junction diode that, when forward biased, emits light at a wavelength that is a function of its material and dopants. For instance, a crystal structure of gallium arsenide (GaAs) permits nonvisible infrared emission. Phosphorous added to GaAs forms gallium arsenide phosphide (GaAsP) and shifts the emission to the visible red region whereas gallium phosphide (GaP) emits in the red, yellow and green regions. The present disclosure is directed to the use of LEDs that emit light, preferably, in the visible spectrum. The crystal structure for the LED is not intended to be limited to any particular type or wavelength emission. For example, LEDs of various wavelengths without special light dissipating optics are commercially available at various wavelengths and light intensities from numerous sources such as those available from Hyosh Company in Japan. It should be understood that LEDs with special light dissipating optics or special light reflecting optics would work. Moreover, it should be understood that organic LEDs (OLED) can be used. OLEDs are known to emit higher intensities of light and may be preferred in some applications where the highest possible light intensities are important. However, the cost is generally higher for these specialized LEDs and since the user is generally concerned with cost these LEDs are less preferred.

The present disclosure advances the technology of lighting achieved through both incandescent and fluorescent lamp technology by significantly improving the energy saving qualities currently available. Energy savings on the order of 50% are easily achieved over most fluorescent applications. Moreover, a significant reduction in heat generation by LED light tube over fluorescent is greater than about 80% with some LED light tube designs operating within +10% of the ambient temperature of the surrounding environment. These significant decreases in heat generation can have a significant impact on cost, size and duty-cycles required of air handling equipment employed within the subject environment. Moreover, given the small size of the individual LED light tube employed in this design (typically 3 mm–5 mm in diameter), the design possibilities for light fixtures that would utilize this light source are increased significantly. For example, the requirement of both fluorescent and incandescent lamps to incorporate some sort of closed envelop to contain the required gasses to cause illumination are not necessary. The necessity for employing fragile glass or ceramic materials in a clear, translucent or semi-opaque configuration is also eliminated. The elimination of these features allows for the construction of light fixtures employing the LED light source with more economical and stronger materials, such as the use of plastic materials. Moreover, the LED light source eliminates the need for employing environmentally harmful gases to achieve the light arc since the LED lamp is a solid-state device.

While preferred embodiments have been shown and described, various modifications and substitutions may be made thereto without departing from the spirit and scope of the invention. Accordingly, it is to be understood that the present disclosure has been described by way of illustration and not limitation.

What is claimed is:

1. A retrofit LED light tube for replacing a fluorescent light tube in a troffer fixture, the LED retrofit light tube comprising:

an elongated cylindrical transparent envelope;

a base cap at each end of the envelope, wherein the base cap comprises a first prong and a second prong extending from the base cap, wherein the first and second prongs are adapted to electrically communicate with a fluorescent light socket; and at least one LED device in electrical communication with the base cap, wherein a positive terminal of the LED device is in electrical communication with the first prong and a negative terminal is in electrical communication with the second prong, wherein the at least one LED device consists of organic light emitting diodes.

2. The retrofit LED light tube of claim 1, wherein the at least one LED device are connected in parallel to additional LED devices.

3. The retrofit LED light tube of claim 1, further comprising a means for protection against a voltage surge.

4. The retrofit LED light tube of claim 3, wherein the means for protection against a voltage surge comprises a varistor positioned in parallel with the at least one LED device.

5. The retrofit LED light tube of claim 1, wherein the LED device comprises a circuit board and a plurality of LEDs serially connected to the circuit board.

6. The retrofit LED light tube of claim 1, wherein the envelope comprises a first half and a second half, wherein the halves are complementary and adapted to form the envelope.

7. The retrofit LED light tube of claim 1, wherein the at least one LED device is connected in series to a half wave rectifier.

8. A retrofit LED light tube for replacing a fluorescent light tube in a troffer fixture, the LED retrofit light tube comprising:

an elongated cylindrical transparent envelope, wherein the envelope comprises a first half and a second half, wherein the halves are complementary and adapted to form the envelope;

a base cap at each end of the envelope, wherein the base cap comprises a first prong and a second prong extending from the base cap, wherein the first and second prongs are adapted to electrically communicate with a fluorescent light socket; and at least one LED device in electrical communication with the base camp, wherein a positive terminal of the LED device is in electrical communication with the first prong and a negative terminal is in electrical communication with the second prong.

9. The retrofit LED light tube of claim 8, wherein the LED device comprises an organic light emitting diode.

10. The retrofit LED light tube of claim 8, wherein the at least one LED device are connected in parallel to additional LED devices.

11. The retrofit LED light tube of claim 8, further comprising a means for protection against a voltage surge.

12. The retrofit LED light tube of claim 11, wherein the means for protection against a voltage surge comprises a varistor positioned in parallel with the at least one LED device.

13. The retrofit LED light tube of claim 8, wherein the LED device comprises a circuit board and a plurality of LEDs serially connected to the circuit board.

14. The retrofit LED light tube of claim 8, wherein the at least one LED device is connected in series to a half wave rectifier.

* * * * *